United States Patent [19]

Ulicne et al.

[11] Patent Number: 5,553,875
[45] Date of Patent: Sep. 10, 1996

[54] COLLAPSIBLE SLED WITH AUTOMATIC LOCKING MEANS, AND METHODS OF CONSTRUCTING AND UTILIZING SAME

[75] Inventors: Joseph A. Ulicne, 9662 Waterway, Grosse Ile, Mich. 48138; Al Morris, Warren, Mich.

[73] Assignees: Joseph A. Ulicne, Grosse Ile; John Hamilton, Northville, both of Mich.

[21] Appl. No.: 204,651

[22] Filed: Mar. 2, 1994

[51] Int. Cl.⁶ .................................................. B62B 13/16
[52] U.S. Cl. ............................................. 280/20; 280/15
[58] Field of Search ........................... 280/20, 30, 639, 280/9, 11, 15; 74/577 R; 248/166, 436

[56] References Cited

U.S. PATENT DOCUMENTS

| 283,112 | 3/1883 | McFrisby . | |
|---|---|---|---|
| 1,714,902 | 5/1929 | Croswell | 280/9 |
| 1,829,957 | 11/1931 | Huntington | 280/9 |
| 2,472,920 | 6/1949 | Peenstra | 280/20 |
| 2,615,724 | 10/1952 | Lee | 280/20 |
| 2,673,744 | 3/1954 | Johnson | 280/20 |
| 3,580,592 | 5/1971 | Schrecengost . | |
| 3,583,722 | 6/1971 | Jacobson | 280/20 |
| 3,912,290 | 10/1975 | Rich | 280/20 |
| 4,552,371 | 11/1985 | McFrisby | 280/20 |
| 4,561,665 | 12/1985 | McFrisby | 280/20 |
| 5,106,109 | 4/1992 | Tattersall et al. | 280/9 |
| 5,201,536 | 4/1993 | Bono et al. | 280/30 |

FOREIGN PATENT DOCUMENTS 3151643 7/1983 Germany ................. 280/20

*Primary Examiner*—Eric D. Culbreth
*Assistant Examiner*—Michael Mar
*Attorney, Agent, or Firm*—Weiner, Carrier & Burt, P.C.; Irving M. Weiner; William F. Esser

[57] ABSTRACT

A collapsible sled for transporting items having a front section and a rear section pivotally connected to each other so as to be positioned in operable and collapsible positions. The sled includes a runners, each of which includes a V-shaped blade and a pawl and ratchet assembly for automatically locking each runner into an operable position relative to the front and rear sections; a snap lock for locking the front and rear sections into the collapsible position; and a slidable lock for locking the runners to the front and rear sections when the sled is in the collapsible position.

14 Claims, 2 Drawing Sheets

_5,553,875_

COLLAPSIBLE SLED WITH AUTOMATIC LOCKING MEANS, AND METHODS OF CONSTRUCTING AND UTILIZING SAME

BACKGROUND OF THE INVENTION

This invention relates to a collapsible sled for transporting game or other items over terrain, and particularly to a lightweight sled which collapses into a compact position when not in use so as to be easily transported by the user thereof.

DESCRIPTION OF THE RELEVANT ART

There are known collapsible sleds. For example, Peenstra U.S. Pat. No. 2,472,920 discloses a folding sled for children. Peenstra fails to disclose a collapsible sled having means for automatically locking the sled runners into an operable position.

Johnson U.S. Pat. No. 2,673,744 discloses a collapsible sled, but fails to disclose automatic means for slidably locking the sled runners into an operable position.

Schrecengost U.S. Pat. No. 3,580,592 discloses a combination deer carcass sled and chaise lounge. Schrecengost fails to disclose a sled that collapses into a compact position including runners that slidably lock into an operable position.

Jacobson U.S. Pat. No. 3,583,722 discloses a collapsible bobsled, but fails to disclose a sled for transporting game or other articles which collapses into a compact, box-like structure for transport thereof.

McFrisby U.S. Pat. Nos. 4,552,371 and 4,561,665 disclose a collapsible sled utilizing screw and fastener mechanisms, respectively, to lock the sled runners into an operable position. MeFrisby fails to disclose a first slidable locking means for automatically locking the runners into an operable position, runner blades shaped for a variety of terrains, and a second slidable locking means to secure the two sled sections together when in the collapsed position.

SUMMARY OF THE INVENTION

The present invention overcomes the above-discussed limitations and shortcomings of known collapsible sleds, and satisfies a significant need for such a sled which is lightweight and capable of quick and easy assembly and disassembly.

According to the present invention, there is provided a collapsible sled which is very compact when in its collapsed position, with its runners swung completely within its box-like enclosure for easy and convenient handling. The sled simply folds out into its operable position, with its runners automatically slidably locking into place.

There is provided a collapsible sled having substantially box-like front and rear sections pivotally connected to each other, each of which comprises a support platform when in an operable position; a plurality of runners pivotally attached to both the front and rear sled sections so as to extend substantially laterally outwardly therefrom when the sled is in an operable position, and to fold within each sled section when the sled is in a collapsible position; a first slidable locking means for automatically locking the sled runners into the operable position; a second locking means for stably securing the runners within each sled section when the sled is in the collapsed position; and a third locking means, attached to the front and rear sled sections, for securing the sections together in a locked engagement when the sections are in the collapsed position.

In use, the device is collapsed for efficient transport or storage by first deactivating the first locking means holding each runner in an operable position, folding the runners within their corresponding sled sections, and securing them into place. Next, the two sled sections are folded together to substantially form a box-like structure having the runners completely located therein. The sled sections are locked into the collapsible position by sliding the two portions of the third locking means (located on the sides of both sled sections) together until they snap into engagement. Thereafter, the sled can be easily transported by carrying the collapsed sled over the user's shoulder through the use of a strap attached to and extending outwardly from a sled section, or by carrying the sled using the handle apertures located on both sled sections.

The sled is placed into its operable position by reversing the steps necessary to collapse the sled. With the sled sections unfolded and the runners extending downwardly from each section, the sled can be towed by a rope connected thereto through two apertures located on the front sled section.

In the operable position, the sled sections are pivotally flexible relative to each other so as to provide a substantially smooth ride by better conforming to the terrain. Further, the runner blade edges are substantially V-shaped so as to provide for an easier tow.

It is an object of the invention to provide a collapsible sled which quickly and easily transforms into and out from a compact structure automatically without requiring additional hardware therefor.

Another object of the invention is to provide a collapsible sled that traverses terrain in a substantially frictionless manner.

It is also an object of the invention to provide a collapsible sled that is sturdy, yet lightweight so as to be conveniently transported when not in use.

Other objects, advantages and salient features of the present invention will become apparent from the following detailed description, which, when taken in conjunction with the annexed drawings, discloses preferred embodiments of the present invention.

DETAILED DESCRIPTION OF THE PREFERRED EMBODIMENT

Referring to FIGS. 1–6, there is shown a collapsible sled according to the present invention, containing front section 1, rear section 2, runners 3, and runner locking means 4–6. The sled is adapted to tow loads weighing several hundred pounds, yet is relatively lightweight for easy transport when not in use. By way of example, the sled preferably but not necessarily weighs less than sixteen pounds.

Because front section 1 and rear section 2 are constructed substantially identically, the description of one section set forth hereinbelow applies substantially equally to the other.

Figure 2:
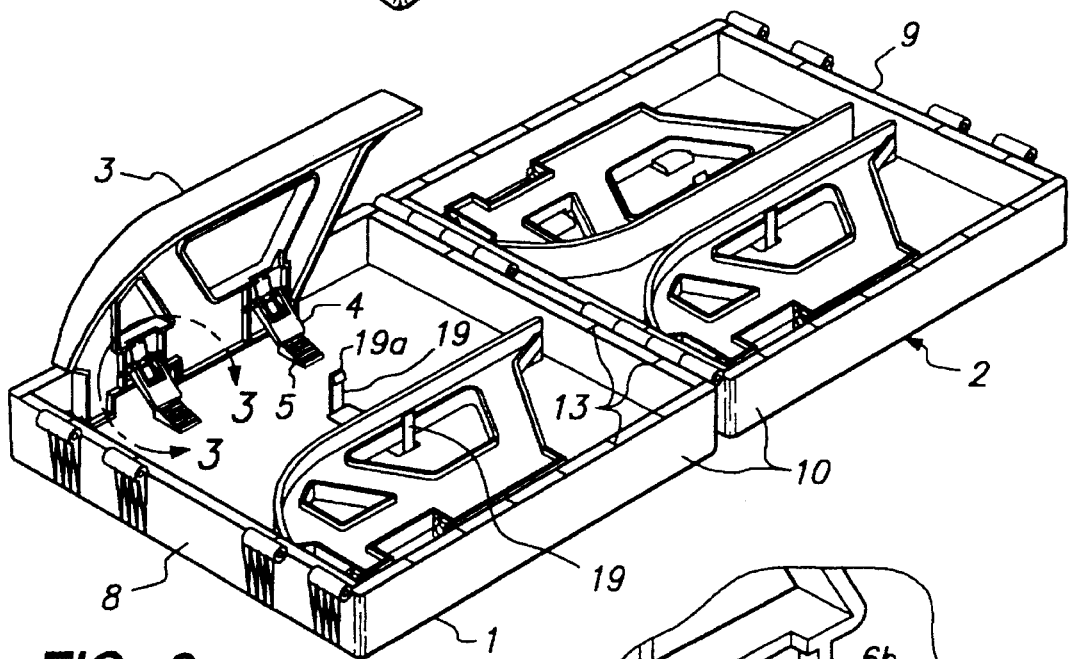
FIG. 2 is a perspective view of a first preferred embodiment of the present invention showing the underside of the invention.

Front section 1 preferably but not necessarily includes rectangular support platform 7 to which front wall 8, rear wall 9, and side walls 10 are attached to form a box-like enclosure. For capably supporting heavy loads, inner support walls are preferably but not necessarily formed adjacent and parallel to each front wall 8, rear wall 9, and side wall 10, having baffles 13 periodically spaced therebetween, as shown in FIG. 2.

Front section 1 is preferably but not necessarily constructed from a sturdy, yet lightweight material such as molded plastic or fiberglass, but it may alternatively be constructed from sheet metal or other materials.

Figure 5:
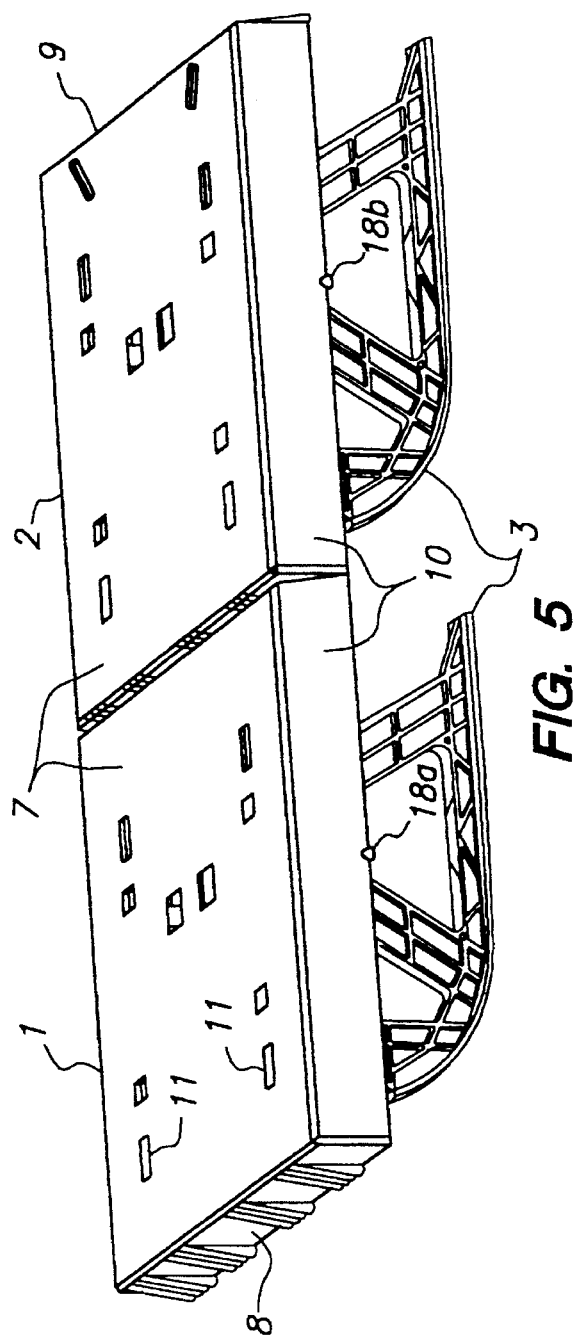
FIG. 5 is a perspective view of a first preferred embodiment of the present invention showing the invention in its operable position.

Tow rope apertures 11 are preferably but not necessarily located on rectangular platform 7 proximally near front wall 8 for facilitating towing the sled with a tow rope, as shown in FIG. 5. When the sled is collapsed, a tow rope may be inserted within the tow rope apertures 11 so as to be substantially contained in the box-like enclosure partially formed by front section 1. A plurality of apertures defining handles are preferably but not necessarily included on front section 1 to provide means for transporting the collapsed sled.

Figure 1:
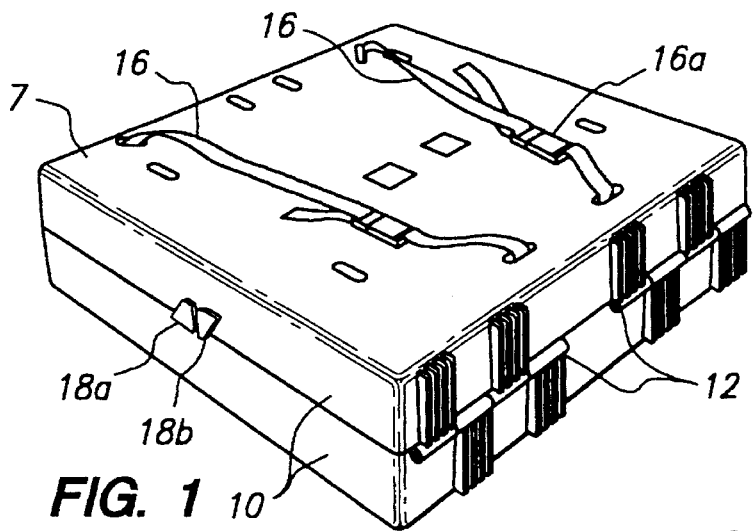
FIG. 1 is a perspective view of a first preferred embodiment of the present invention showing the invention in its collapsed position.

Sled sections 1 and 2 further include hinges 12 which are molded to the ends of rear wall 9 and front wall 8 of sections 1 and 2, respectively, and mate with each other in order for sections 1 and 2 to be pivotally connected (FIG. 1). Hinge pins are inserted into hinges 12, thus securely holding sections 1 and 2 together. In such an arrangement, sections 1 and 2 freely pivot in 180° rotation from an operable position when support platforms 7 are substantially planar, to a collapsible position when front wall 8 of section 1 and rear wall 9 of section 2 are adjacent to and contact each other. In the collapsible position, a box-like structure is formed by support platforms 7, front walls 8, rear walls 9, and sidewalls 10 of sled sections 1 and 2, as shown in FIG. 1.

The present invention preferably but not necessarily includes a means for holding sled sections 1 and 2 together in a collapsible position. Sled locking means preferably but not necessarily includes snap members 18a and 18b, which are connected to both side walls 10 of section 1 and section 2, respectively, and frictionally engage with each other when the sled is in the collapsible position (FIG. 1). The sled is unlocked by pivotally moving section 1 from section 2, which causes snap member 18a to releasably disengage from snap member 18a.

The present invention additionally includes a plurality of runners 3 which attach to sled sections 1 and 2, and are adapted to pivot in a substantially 90° rotation from a collapsible position when runners 3 are substantially positioned within section 1 or 2, to an operable position when runners 3 are extended outwardly from the underside of support platforms 7 of sled sections 1 and 2 in a substantially perpendicular relation therewith. Each sled section preferably includes two adjacent runners 3, as shown in FIG. 2.

Figure 6:
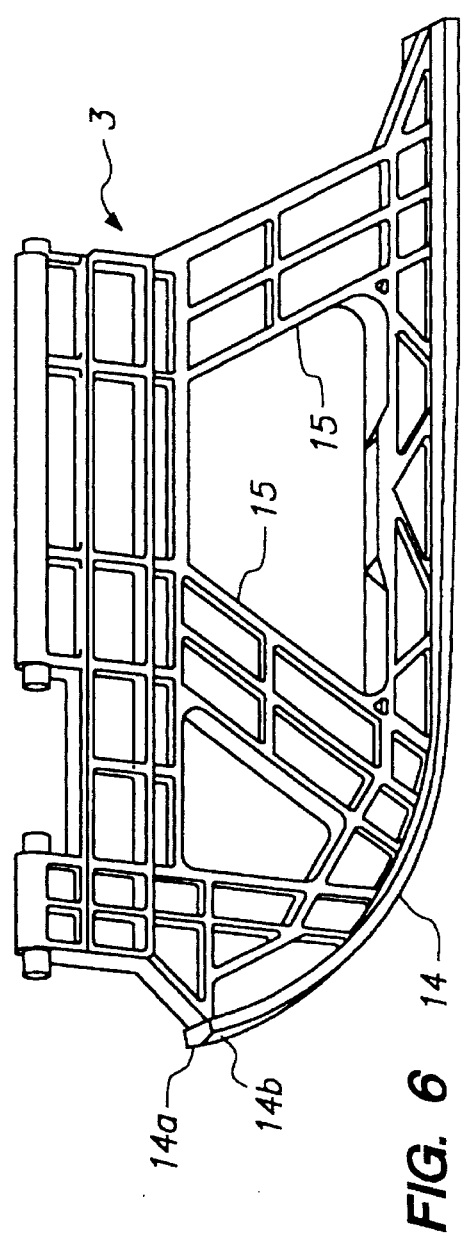
FIG. 6 is a side elevational view of a runner of the present invention.

Each runner 3 comprises blade 14 and supporting members 15. As shown in FIG. 6, blade edges 14a and 14b preferably form a substantially V-shape to reduce drag when the sled is pulled in the operable position. In addition, blades 14 of runners 3 are preferably substantially widened relative to support members 15 so as to minimize or substantially prevent sinkage in soft terrain, such as snow or mud. Runners 3 are preferably comprised from a lightweight material such as molded plastic, fiberglass, or aluminum, but alternatively runners 3 may be comprised from other materials. In addition, support members 15 may include a plurality of apertures situated therein to reduce weight yet maintain strength so as to support transportable loads weighing several hundred pounds.

Figure 3:
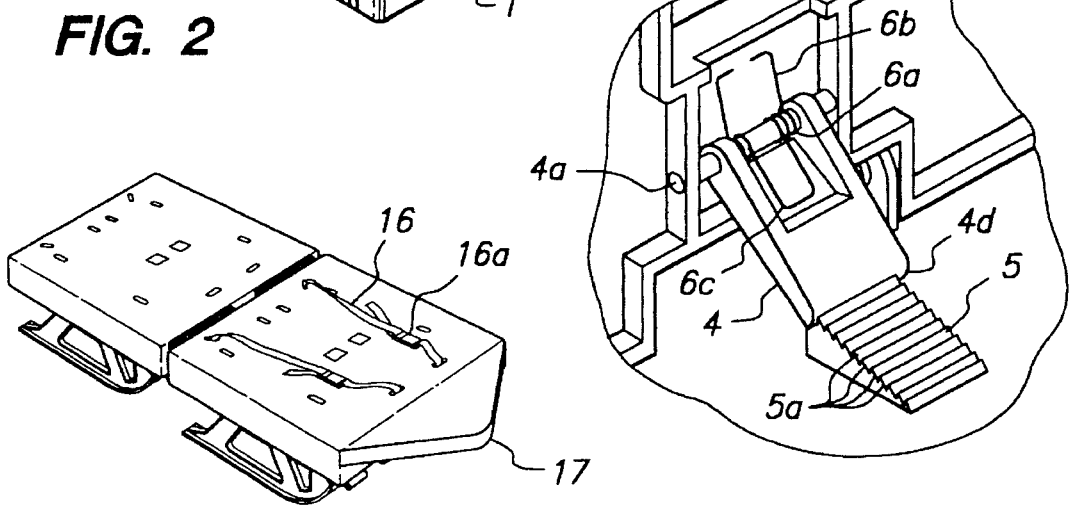
FIG. 3 is a perspective view of the present invention taken within the curve 3—3 in FIG. 2.

The present invention includes a means for locking runners 3 in the operable position substantially automatically. The runner locking means preferably but not necessarily comprises pawl 4, ratchet member 5, and spring 6, with two such locking means preferably, but not necessarily, provided for each runner 3, as shown in FIGS. 2 and 3. For example, the locking means for runner 3 may alternatively comprise a single pawl/ratchet/spring assembly.

Pawl 4 is preferably but not necessarily substantially wedge-shaped. One end of pawl 4 preferably but not necessarily pivotally attaches to runner 3 at a longitudinally central portion thereon by pawl pin 4a being inserted through pawl 4 and runner 3, as shown in FIG. 3. Pawl 4 preferably but not necessarily includes slot 4d situated at its unconnected end.

Ratchet member 5 is preferably but not necessarily formed integrally with platform 7 of sled sections 1 and 2, and extends outwardly from the underside thereof, as shown in FIGS. 2 and 3. Ratchet member 5 includes at least one tooth 5a to firmly engage with slot 4d of pawl 4 when runner 3 is secured in its operable position.

The runner locking means of the present invention preferably but not necessarily includes biasing means 6, preferably attached to pawl 4 and runner 3 at a central portion thereon. Referring to FIG. 3, biasing means 6 preferably but not necessarily comprises spring 6 having coiled portions 6a, each of which encircles pawl pin 4a, and end portions 6b and 6c that extend from each end of coiled portions 6a so as to provide a biasing force on pawl 4 relative to runner 3 that urges the free end of pawl 4 substantially against the underside of platform 7. When in the operable position, biasing means 6 continuously causes pawl 4 to maintain contact with ratchet member 5 so as to support runner 3 in a laterally extending position relative to platform 7 of sled sections 1 and 2. Pawl 4 and ratchet member 5 are sized proportionally and positioned along runner 3 and platform 7 to allow the sled to easily handle loads weighing several hundred pounds.

Further, the present invention includes means for firmly locking runners 3 in a collapsed position, including tabs 19 which extend outwardly from the underside of platform 7 of sled sections 1 and 2. Tab 19 preferably but not necessarily includes end portion 19a which extends laterally outwardly therefrom and is narrowly tapered at its top, as shown in FIG. 2. In this way, when runner 3 is pivoted into its collapsed position, runner 3 slides under end portion 19a of tab 19 so as to engage therewith, and is held thereby in a fixed position (FIG. 2). Although substantially rigid relative to platform 7 of sled sections 1 and 2, tabs 19 are preferably slightly pivotable relative thereto in order to easily disengage runners 3 from their collapsed position.

In use, runners 3 are placed in their operable position by disengaging each from their corresponding tabs 19, and rotatably moving runners 3 away from the underside surface of platform 7 of sled sections 1 and 2 until runners 3 are substantially perpendicular therewith and slot 4d of each pawl 4 engages with a tooth 5a of its corresponding ratchet member 5 (FIGS. 2 and 3). Biasing means 6 applies a rotational force on pawl 4 relative to runner 3 in order for each pawl 4 to maintain contact with its ratchet member 5.

Runners 3 are placed in the collapsible position by disengaging each pawl 4 from its associated ratchet member 5. Thereafter, runners 3 may be pivoted relative to platform 7 of sections 1 and 2 until runners 3 engage with their corresponding end portion 19a of tab 19, thus locking runners 3 firmly in place in the collapsed position. To disengage runners 3 from their corresponding tab 19, end portion 19a of tabs 19 are moved slightly away therefrom.

The preferred embodiment of the present invention further includes means for transporting the sled when in the collapsible position, comprising strap 16 which is inserted through strap apertures located on platform 7 of sled sections 1 and 2 so as to form a shoulder strap for carrying the collapsed sled, as shown in FIG. 1. Buckle 16a is preferably provided with strap 16 for adjustment thereof.

Figure 4:
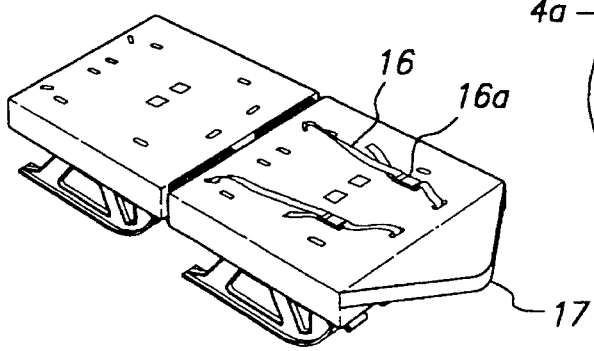
FIG. 4 is a perspective view of a second preferred embodiment of the present invention showing the invention in its operable position.

Strap 16 also provides a means for securing the transported article to the sled when the sled is in use (FIG. 4).

Sled section 1 optionally includes means for diverting articles from the sled's path when the sled is in use. As shown in FIG. 4, the diverting means preferably but not necessarily comprises a substantially triangular or trapezoidal extension 17 which is formed integrally with section 1. In use, extension 17 diverts obstacles to either side of the sled, thus resulting in an easier and more even tow with less chance of articles being caught thereunder.

Although there have been described what is at present considered to be the preferred embodiment of the invention, it will be understood that the invention can be embodied in other specific forms without departing from the spirit or essential characteristics thereof.

For example, in order to easily disengage the two pawl/ratchet assemblies corresponding to a single runner 3 substantially concurrently, a rod may preferably but not necessarily attach to both pawls 4 so as to form a handle therebetween. Both pawls 4 corresponding to a single runner 3 are disengaged simply by lifting the handle.

Alternate means for holding runners 3 in their operable position may optionally replace the above-described pawl/ratchet assembly. For instance, a plurality of hooks may pivotally attach to the interior side of side walls 10 and be engagable with a tab portion extending laterally outwardly from each runner 3 so that once engaged therewith, the hook keeps its corresponding runner 3 from pivotally moving towards platform 7 of sled sections 1 and 2. Alternatively, piping my be insertable between adjacent runners 3 so as to hold each in its operable position.

The described embodiments are, therefore, to be considered in all aspects as illustrative, and not restrictive. The scope of the invention is indicated by the appended claims, rather than by the foregoing description.

We claim:

1. A collapsible sled for transporting items, comprising:

a front section;

a rear section pivotally attached to said front section so as to position said front and rear sections in both a collapsed position and an operable position;

a plurality of runners pivotally attached to said front and rear sections so as to allow said runners to be positioned in both said collapsed and operable positions relative to said front and rear sections;

first locking means, connected to each of said runners and said front and rear sections, for automatically locking said runners in said operable position upon movement of said runners into said operable position from said collapsed position, said first locking means including a biased locking member having one end pivotally connected to one of a respective runner and one of said sections and an opposite end selectively engagable with an engagement member fixed to the other one of a respective runner and one of said sections, and second locking means for automatically locking said runners in said collapsed position upon movement of said runners into said collapsed position from said operable position;

a major surface of said rear section being positioned substantially against said front section in said collapsed position so as to form a box-like structure, and said runners being positioned within said front and rear sections in said collapsed position; and said rear section being positioned substantially planar with a major surface of said front section in said operable position, and said runners being laterally outwardly extended from an inner surface of said front and rear sections in substantially perpendicular relation to said major surfaces in said operable position.

2. A collapsible sled as recited in claim 1, wherein:

said locking member includes a pawl pivotally connected to each of said runners.

3. A collapsible sled as recited in claim 2, wherein:

said engagement member includes a ratchet member formed integrally with said front and rear sections and extending from an underside thereof so as to engage with a free end of said pawl in said operable position.

4. A collapsible sled as recited in claim 3, wherein:

said first locking means includes a biasing means for urging said pawl substantially against said ratchet member when in said operable position.

5. A collapsible sled as recited in claim 2, wherein:

a free end of said pawl members substantially automatically engage with said front and rear sections so as to support said runners in said operable position.

6. A collapsible sled as recited in claim 5, wherein:

said locking means further includes a means for biasing said pawl members into detachable engagement with said front and rear sections.

7. A collapsible sled as recited in claim 1, wherein:

said runners includes blades having edges which form a substantially V-shape.

8. A collapsible sled as recited in claim 1, including:

a third locking means, connected to said front and rear sections, for slidably locking said rear section to said front section in said collapsible position.

9. A collapsible sled as recited in claim 1, including:

means for securing the items to a top portion of said front and rear sections when in said operable position, and for carrying the sled in said collapsed position.

10. A collapsible sled as recited in claim 1, further including:

means, attached to said front section, for diverting obstacles from the path of said sled.

11. A collapsible sled as recited in claim 1, wherein:

said front and rear sections include a plurality of tab members extending outwardly from an inner surface thereof so as to frictionally engage with said runners when said sled is in said collapsed position.

12. A collapsible sled as recited in claim 1, wherein:

said front and rear sections include front, rear, and side walls; and said front, rear, and side walls each includes an inner wall adjacent and parallel to said front, rear, and side walls and at a spaced distance therefrom.

13. A collapsible sled as recited in claim 1, wherein:

said rear section is pivotally flexible relative to said front section when in said operable position for transport over uneven terrain.

14. A collapsible sled as recited in claim 1, wherein:

said automatic locking means allows said runners to be moved from said collapsed position to said operable position, and substantially prevents movement of said runners from said operable position to said collapsed position; and said automatic locking means is selectively deactivated.

* * * * *